(12) United States Patent
Higuma et al.

(10) Patent No.: US 8,402,655 B2
(45) Date of Patent: Mar. 26, 2013

(54) METHOD OF PROCESSING ORIFICE

(75) Inventors: Masato Higuma, Hitachinaka (JP);
Kenichi Gunji, Mito (JP); Tsuneyoshi Inoue, Mito (JP); Yasuyuki Tanaka, Hitachinaka (JP); Hideki Fukushima, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 462 days.

(21) Appl. No.: 12/708,261

(22) Filed: Feb. 18, 2010

(65) Prior Publication Data
US 2010/0229385 A1    Sep. 16, 2010

(30) Foreign Application Priority Data

Mar. 16, 2009  (JP) ................................ 2009-062226

(51) Int. Cl.
*B21K 1/24*  (2006.01)
*B23P 17/00*  (2006.01)
*B26D 7/00*  (2006.01)

(52) U.S. Cl. ......... 29/890.122; 29/890.132; 29/890.142; 72/333; 83/733; 239/533.3; 408/1 R (58) Field of Classification Search ................ 29/888.4, 29/888.44, 890.122, 890.132, 890.142; 72/333; 83/686, 733; 239/533.3; 408/1 R
See application file for complete search history.

(56) References Cited

U.S. PATENT DOCUMENTS

| | | | |
|---|---|---|---|
| 5,092,039 A * | 3/1992 | Gaskell ................... | 29/890.142 |
| 5,239,751 A * | 8/1993 | Kanamaru et al. ......... | 29/888.44 |
| 6,678,955 B2 * | 1/2004 | Takeshita et al. ........ | 29/890.142 |
| 7,874,070 B2 * | 1/2011 | Gunji et al. .................. | 29/888.4 |
| 2009/0242668 A1 | 10/2009 | Higuma et al. | |

FOREIGN PATENT DOCUMENTS

JP    2008-184977 A    8/2008

* cited by examiner

*Primary Examiner* — Alexander P Taousakis
(74) *Attorney, Agent, or Firm* — Crowell & Moring LLP (57) ABSTRACT

Disclosed herein is a method for processing an orifice capable of processing recessed portions and orifices, each having a unique hole diameter different from each other, to high positioning accuracy and in a short time.
A press includes: a B-axis angle indexing device 3 disposed on a base 2b, the B-axis angle indexing device 3 including a table B; an A-axis angle indexing device 25 disposed on the table B, the A-axis angle indexing device 25 including a table A; a chuck 32 disposed on the table A, the chuck 32 for holding a work; a base Z 6 disposed on a base, the base Z 6 being operable in an axis Z-direction; a base X 8 disposed on the base Z, the base X 8 being operable in an axis X-direction; a punch holding portion 13 disposed on the base X, the punch holding portion 13 being operable vertically in an axis Y-direction; and a plurality of punches 19, 22 held on the punch holding portion in parallel with the axis Z. The press is used to perform a pressing cycle at a desired position by changing a posture of the work and moving the punch in the Z-direction continuously using punches having different leading end diameters and shapes with the work held in the chuck.

10 Claims, 6 Drawing Sheets

METHOD OF PROCESSING ORIFICE

BACKGROUND OF THE INVENTION

1. Field of the Invention

The present invention relates to processing methods of holes using a complete die that includes a pair of a punch and a die, and a plate holding the same. The invention more particularly relates to a processing method suitable for processing a shouldered hole, in which an orifice of a fuel injection valve is formed, inclined relative to an axis of the fuel injection valve, together with a recessed portion having a diameter larger than an orifice diameter at an outlet portion of the orifice.

2. Description of the Related Art

A known apparatus for processing an orifice includes a stage movable in an X-axis direction and a Y-axis direction and an elevator mechanism movable vertically in a Z-axis direction. The apparatus further includes a rotational mechanism disposed on the stage, the rotational mechanism being oscillatable about an axis extending in parallel with a stage surface and rotatable about an axis extending perpendicularly to the stage surface. A collet chuck holding an orifice plate as a workpiece is fixed on the rotational mechanism and a tool holder holding a processing tool is fixed on the elevator mechanism (see JP-2008-184977-A). This processing apparatus includes a tool changer that exchanges processing tools, capable of processing a plurality of recessed portions and orifices, each of the recessed portions and orifices having a unique diameter different from each other, by exchanging processing tools with the orifice plate as the workpiece held in the collet chuck. In addition, the orifice plate held in the collet chuck is moved in the X-axis direction and the Y-axis direction by the stage and angled at varying inclination angles relative to the processing tool by the rotational mechanism, so that six sets of recessed portions and orifices are processed having an axis of each of the recessed portions and orifices inclined at a unique inclination angle relative to a central axis of the orifice plate.

SUMMARY OF THE INVENTION

The above-described known art requires that the processing tools be changed according to the orifice diameter in order to process the recessed portions and orifices, each having a unique orifice diameter different from each other. Changing the processing tools can result in a relative positional relationship between the position of a leading end of the processing tool and the orifice plate as the workpiece being deviated. This requires that work be done for adjusting the relative positional relationship between the position of the leading end of the processing tool and the orifice plate as the workpiece, each time the processing tools are changed, resulting in an extended period of processing time. The orifice diameter as the term is here used refers to the diameter of the recessed portion or the orifice. The recessed portion and the orifice are included in holes. The orifice as a through hole, in particular, is included in the through hole. Accordingly, a hole diameter of the orifice is also referred to as a through hole diameter.

An object of the present invention is to provide a method for processing an orifice capable of processing recessed portions and orifices, each having a unique hole diameter different from each other, to high positioning accuracy and in a short time.

To achieve the foregoing object, a method for processing an orifice according to the present invention includes:

a first step of selecting any one of a plurality of punches which is disposed so as to have an axis in a horizontal direction and a positional relationship of which relative to a work held in a chuck is stored in memory;

a second step of, following the first step, positioning the punch in a first axis direction that is perpendicular to a vertical direction and a punch axis direction, and in the vertical direction;

a third step of positioning the work by oscillating and rotating the work about a second axis in the vertical direction and a third axis in the horizontal direction oscillatable about the second axis;

a fourth step of, following the second and third steps, pressing to process the work by moving the punch straightforwardly in the punch axis direction;

a fifth step of, following the fourth step, removing the punch from the work by moving the punch straightforwardly in a direction opposite the straightforward direction in the fourth step; and returning to the first step with the work held in the chuck after performance of steps of from the first through fifth steps, selecting a punch that is different from the punch selected in the first step, and performing the second through fifth steps to thereby process holes including an orifice and a recessed portion disposed at an outlet opening portion of the orifice.

In the above method for processing an orifice, preferably, a recessed portion having an axis inclined relative to a central axis of the work is formed on a surface of the work by performing steps of from the first through fifth steps;

after the recessed portion has been formed, another recessed portion is formed at a position different from the recessed portion using the punch used for pressing to process the recessed portion by performing steps of from the second through fifth steps, to thereby form a plurality of recessed portions;

after the plurality of recessed portions have been formed, another punch that is different from that used for pressing to process the plurality of recessed portions is selected by performing the first step and an orifice is formed in any one of the plurality of recessed portions by performing steps of from the second through fifth steps; and after the orifice has been formed, another orifice is formed using the punch used for pressing to process the orifice in another recessed portion of the plurality of recessed portions by performing steps of from the second through fifth steps.

According to the present invention, the recessed portions and orifices, each having a unique hole diameter different from each other, can be processed to high positioning accuracy and within a short time. For an arrangement including a plurality of deflected orifices having different inclination angles relative to the central axis of the fuel injection valve, in particular, accuracy in positions and angles between orifices can be enhanced, so that the processing method of the present invention allows fuel injection valves to be obtained with only small variations in injection characteristics.

DESCRIPTION OF THE PREFERRED EMBODIMENTS

An embodiment of the present invention has the following modes.

The following steps are performed:

a first step of selecting any one of a plurality of punches which is disposed so as to have an axis in a horizontal direction and a positional relationship of which relative to a work held in a chuck is stored in memory;

a second step of, following the first step, positioning the punch in a first axis direction that is perpendicular to a vertical direction and a punch axis direction, and in the vertical direction;

a third step of positioning the work by oscillating and rotating the work about a second axis in the vertical direction and a third axis in the horizontal direction oscillatable about the second axis;

a fourth step of, following the second and third steps, pressing to process the work by moving the punch straightforwardly in the punch axis direction;

a fifth step of, following the fourth step, removing the punch from the work by moving the punch straightforwardly in a direction opposite the straightforward direction in the fourth step; and returning to the first step with the work held in the chuck after performance of steps of from the first through fifth steps, selecting a punch that is different from the punch selected in the first step, and performing the second through fifth steps to thereby process holes including an orifice and a recessed portion disposed at an outlet opening portion of the orifice.

In the above method for processing an orifice, a recessed portion having an axis inclined relative to a central axis of the work is formed on a surface of the work by performing steps of from the first through fifth steps;

after the recessed portion has been formed, another recessed portion is formed at a position different from the recessed portion using the punch used for pressing to process the recessed portion by performing steps of from the second through fifth steps, to thereby form a plurality of recessed portions;

after the plurality of recessed portions have been formed, another punch that is different from that used for pressing to process the plurality of recessed portions is selected by performing the first step and an orifice is formed in any one of the plurality of recessed portions by performing steps of from the second through fifth steps; and after the orifice has been formed, another orifice is formed using the punch used for pressing to process the orifice in another recessed portion of the plurality of recessed portions by performing steps of from the second through fifth steps.

Further specifically, a method for processing an orifice uses a horizontal press as detailed below to perform operations as detailed below. The horizontal press includes: a base; a B-axis angle indexing device disposed on the base, the B-axis angle indexing device including a table B, a rotation angle of which is adjustable about an axis B; an A-axis angle indexing device disposed on the table B, the A-axis angle indexing device including a table A, a rotation angle of which is adjustable about an axis A that is orthogonal to the axis B; a work holding portion disposed on the table A, the work holding portion including a chuck rotatable concentrically with the table A; a cylindrical work held in the chuck; an ejector pin operative in a direction of the axis A during ejection of the work; an actuator a held on an end surface opposite the table A of the A-axis angle indexing device, the actuator a for applying a thrust force to the chuck to thereby open or close the chuck; an actuator b held on an end surface of the actuator a opposite the end surface of the table A on which the actuator a is held, the actuator b for operating the ejector pin; a base Z disposed on the base, the base Z being operable in an axis Z-direction that is orthogonal to the axis B; a base X disposed on the base Z, the base X being operable in an axis X-direction that is orthogonal to the axis Z; a punch holding portion disposed on the base X, the punch holding portion being operable vertically in an axis Y-direction that is orthogonal to the axis X; and a plurality of punches held on the punch holding portion in parallel with the axis Z, each of the punches having a unique leading end diameter different from each other. The horizontal press controls through an NC program an X-direction actuator for moving the base X in the axis X-direction, a Y-direction actuator for moving a base Y in the axis Y-direction, a Z-direction actuator for moving the base Z in the axis Z-direction, the A-axis angle indexing device for adjusting the rotation angle of the table A about the axis A, the B-axis angle indexing device for adjusting the rotation angle of the table B about the axis B, the actuator a, and the actuator b. The method includes: a first step of positioning the cylindrical work by rotating the A-axis angle indexing device and the B-axis angle indexing device; a second step of positioning the punch by moving the base X and the base Y; a third step of pressing to process the cylindrical work up to a predetermined Z position by moving the base Z straightforwardly in the axis Z-direction; a fourth step of bringing the punch to a stop at a bottom dead center; a fifth step of removing the punch by moving the base Z straightforwardly in a direction opposite that in the third step; and performing steps of from the first through fifth steps a plurality of number of times using an identical or a different punch and deviating a processing portion with the cylindrical work left held in position and thereafter moving the ejector pin in the axis A-direction to thereby eject the cylindrical work out of the chuck.

The above processing method may also be applied to processing a three-dimensional part as detailed below.

The processing method uses a horizontal press as detailed below to perform operations as detailed below. The horizontal press includes: a base; a B-axis angle indexing device disposed on the base, the B-axis angle indexing device including a table B, a rotation angle of which is adjustable about an axis B; an A-axis angle indexing device disposed on the table B, the A-axis angle indexing device including a table A, a rotation angle of which is adjustable about an axis A that is orthogonal to the axis B; a work holding portion disposed on the table A, the work holding portion including a chuck rotatable concentrically with the table A; a work held in the chuck; an ejector pin operative in a direction of the axis A during ejection of the work; an actuator a held on an end surface opposite the table A of the A-axis angle indexing device, the actuator a for applying a thrust force to the chuck to thereby open or close the chuck; an actuator b held on an end surface of the actuator a opposite the end surface of the table A on which the actuator a is held, the actuator b for operating the ejector pin; a base Z disposed on the base, the base Z being operable in an axis Z-direction that is orthogonal to the axis B; a base X disposed on the base Z, the base X being operable in an axis X-direction that is orthogonal to the axis Z; a punch holding portion disposed on the base X, the punch holding portion being operable vertically in an axis Y-direction that is orthogonal to the axis X; and a plurality of punches held on the punch holding portion in parallel with the axis Z.

The method includes: a first step of positioning the work by rotating the A-axis angle indexing device and the B-axis angle indexing device; a second step of positioning the punch by moving the base X and the base Y; a third step of pressing to process the work up to a predetermined Z position by moving the base Z straightforwardly in the axis Z-direction; a fourth step of bringing the punch to a stop at a bottom dead center; a fifth step of removing the punch by moving the base Z straightforwardly in a direction opposite that in the third step; and performing steps of from the first through fifth steps a plurality of number of times using an identical or a different punch and deviating a processing portion with the work left held in position and thereafter moving the ejector pin in the axis A-direction to thereby eject the work out of the chuck.

An embodiment of the present invention will be described below. In the descriptions that follow, an orifice diameter refers to the diameter of a recessed portion or an orifice. The recessed portion and the orifice are included in holes. The orifice as a through hole, in particular, is included in the through hole. Accordingly, a hole diameter of the orifice is also referred to as a through hole diameter.

First Embodiment

Figure 2:
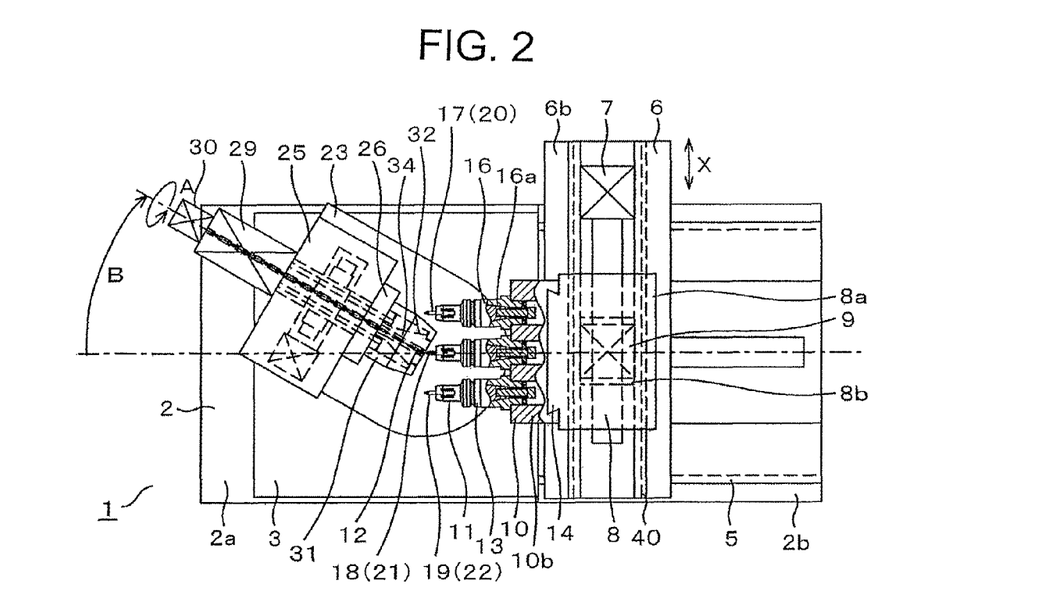
FIG. 2 is a plan view showing the horizontal press (with a B-axis rotated).
Figure 3:
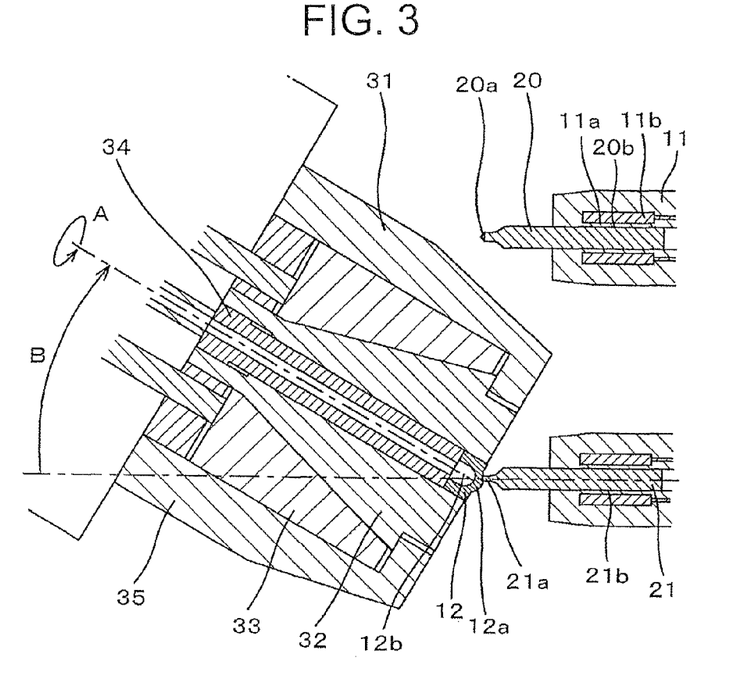
FIG. 3 is an enlarged view showing a processing portion of FIG. 2.

Arrangements of a horizontal press 1 will first be described with reference to FIGS. 1, 2, and 3.

Figure 1:
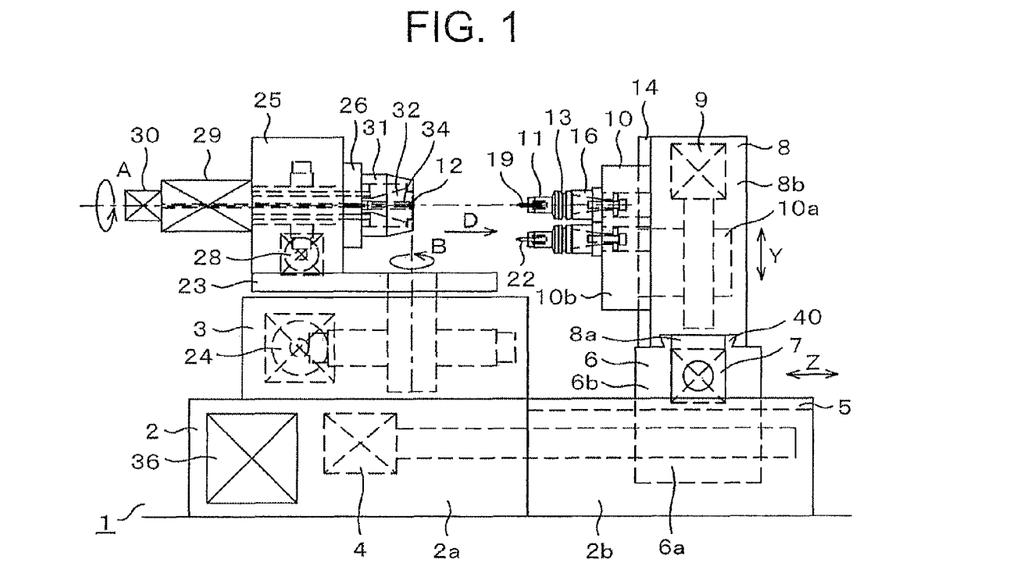
FIG. 1 is a front elevational view showing a horizontal press.

FIG. 1 is a front elevational view showing the horizontal press according to the embodiment of the present invention. FIG. 2 is a plan view showing the horizontal press (with a B-axis rotated). FIG. 3 is an enlarged view showing a processing portion of FIG. 2.

The horizontal press 1 includes a base portion holding a plurality of punches and movable in axes X-, Y-, and Z-directions, and a table portion holding a work 12 and rotatable in axes A- and B-directions. Arrangements of the base portion will first be described.

A base 2 installed horizontally on a floor includes a base 2a and a base 2b disposed adjacent to each other. The base 2a holds a B-axis angle indexing device 3 thereon and includes a Z-direction actuator 4 thereinside. The base 2b includes a guide rail Z 5 formed thereon and a base Z 6 is mounted slidably in the Z-direction while being guided by the guide rail Z 5. At this time, the base Z 6 is activated by the Z-direction actuator 4.

The base Z 6 includes a base Z 6a and a base Z 6b. The base Z 6a is connected to the Z-direction actuator 4 and mounted integrally with the base Z 6b. The base Z 6b is placed on the base 2b, slidable in the axis Z-direction while being guided by the guide rail Z 5, and includes an X-direction actuator 7 thereinside.

A guide rail X 40 is formed on the base Z 6b and a base X 8 is mounted so as to be slidable in the axis X-direction while being guided by the guide rail X 40. At this time, the base X 8 is activated by the X-direction actuator 7.

The base X 8 includes a base X 8a and a base X 8b. The base X 8a is connected to the X-direction actuator 7 and mounted integrally with the base X 8b. The base X 8b is placed on the base Z 6b, slidable in the axis X-direction while being guided by the guide rail X 40, and includes an Y-direction actuator 9 thereinside.

A base Y 10 includes a base Y 10a and a base plate 10b. A punch holding portion 13 that holds punches 17 to 22 in parallel with the axis Z-direction is placed on the base plate 10b. The base Y 10a is connected to the Y-direction actuator 9 and mounted integrally with the base plate 10b. The base X 8b includes a guide rail Y 14 formed thereon. The base plate 10b is mounted so as to be slidable in the axis Y-direction while being guided by the guide rail Y 14. At this time, the base Y 10a is activated by the Y-direction actuator 9.

The punch holding portion 13 includes a holder 11 and an arbor 16 and is held in position by the base plate 10b. At this time, a total of six arbors 16 mounted on the base plate 10b, two rows of arbors 16, each row having three arbors 16 placed in parallel with the axis Z-direction. The arbor 16 includes a taper portion 16a on which the holder 11 is removably and concentrically mounted. Additionally, the holder 11 includes a cylindrical punch retaining portion 11a. The punch retaining portion 11a includes a hydraulic pressure generator 11b formed therein. The six punches 17 to 22 are held herein. Each of the punches 17 to 22 includes a cutting edge portion 17a to 22a and a shank portion 17b to 22b. Specifically, each of the cutting edge portions 17a to 22a has a unique diameter and a unique shape different from each other and each of the shank portions 17b to 22b is held by the holder 11. The punch shank portions 17b to 22b are inserted in the punch retaining portion 11a, the hydraulic pressure generator 11b is made to generate a hydraulic pressure to thereby generate a clamping force in a diametric direction, so that the punches 17 to 22 are held in position. At this time, in order to achieve a gripping force of the punches 17 to 22, the punch shank portions 17b to 22b are adapted to have a diameter larger than that of the punch cutting edge portions 17a to 22a.

This increases a punch holding force to thereby prevent the punch from being misaligned or the position of the punch cutting edge from being changed when the punch is removed.

The foregoing ensures accurate orthogonal movement of the punches 17 to 22 in the axes X, Y, and Z-directions.

Arrangements of the table portion will next be described.

The B-axis angle indexing device 3 is held on the base 2a and includes a table B 23 disposed thereon and a B-axis actuator 24 disposed thereinside. An A-axis angle indexing device 25 is held on the table B 23 at a first end (the side remote from the punches 17 to 22) thereof. Operation of the B-axis actuator 24 causes the table B 23 to rotate about the axis B.

The A-axis angle indexing device 25 includes a table A 26 disposed on an end surface thereof on the side facing the punches 17 to 22, an actuator a 29 disposed on an end surface opposite thereto, and an A-axis actuator 28 disposed thereinside. Operation of the A-axis actuator 28 causes the table A 26 to rotate about the axis A. Additionally, a work holding portion 31 is held on the table A 26 concentrically therewith. The work holding portion 31 includes a chuck 32, a sleeve 33, an ejector pin 34, and a holding frame 35. Specifically, the chuck 32 holds the work 12 of a cylindrical shape. The sleeve 33 translates a thrust force in the axis A-direction from the actuator a 29 to a force contracting the chuck 32 diametrically. The ejector pin 34 ejects the work 12 out of the chuck 32. The holding frame 35 holds the foregoing parts. With the work 12 inserted into the chuck 32, the actuator a 29 applies the thrust force in the axis A-direction (in the direction toward the punches 17 to 22), so that the sleeve 33 moves in the axis A-direction to generate a gripping force, causing the chuck 32 to hold the work 12 in position.

At this time, the holding frame 35 restricts movement of the chuck 32 in the axis A-direction, so that the work 12 can never move in the axis A-direction during clamping.

Accordingly, even if the works 12 are continuously supplied and unloaded for processing, a Z-dimension can be processed with high repeatability. This minimizes variations in hole depth to minimize variations in penetration length.

When the work 12 is ejected, the operation of the actuator a 29 causes a thrust force in a direction opposite during clamping by the chuck 32 to be transmitted to loosen the chuck 32. An actuator b 30 thereafter applies a thrust force in the Z-direction to operate the ejector pin 34, thereby ejecting the work 12 out of the chuck 32.

The work 12 has a cylindrical shape including a protruding spherical portion 12a disposed on an end surface on one side in the axial direction. The A-axis angle indexing device 25 is mounted on the table B 23 such that a center of the spherical portion 12a crosses the axis B. By so doing, a spot where a test indicator does not deflect can be easily identified when the test indicator is applied to the spherical portion 12a and the B-axis is rotated, so that a center of rotation of the axis A can be highly accurately aligned with that of the axis B. In addition, a spot where the test indicator does not deflect can be easily identified when the test indicator is applied to the base plate 10b and the test indicator is moved in the axis Y-direction relative to the table A 26, so that parallelism between the axis Y and the axis B can be accurately achieved. The work 12 has a bowl-shaped recessed portion 12b formed on an end surface thereof opposite the spherical portion 12a.

The foregoing accurately achieves a coordinate system of X, Y, Z, A, and B.

In this embodiment, the axis Y and the axis B extend substantially in parallel with a vertical line. The axis Z and the axis A extend substantially in a horizontal direction. The term "substantially" used herein assumes a condition in which the horizontal press of this embodiment is installed on a level site and means to include a condition in which the axes are inclined relative to the vertical line or the horizontal direction so slight as to be considered to be the extent of an error.

Additionally, the A-axis angle indexing device 25 is of a cantilever structure relative to pressure from the punches 17 to 22, thus creating a space upwardly. A loader that automatically supplies and unloads the work 12 can be installed in this space, which allows a press including a loader to be manufactured compactly and at low cost.

Operation of the X-direction actuator 7, the Y-direction actuator 9, the Z-direction actuator 4, the A-axis actuator 28, the B-axis actuator 24, the actuator a 29, and the actuator b 30 is controlled by a control unit 36. Coordinate values of X, Y, Z, A, and B assigned to each of the punches 17 to 22, a sequence of operation of the punches 17 to 22, pressure and removal speeds of the punches 17 to 22, operation timing of the actuator a 29 and the actuator b 30, and the like are inputted in advance to the control unit 36. These pieces of information are inputted as a whole as a program 1.

Processing of a shouldered hole in a cylindrical orifice plate having a plurality of orifices, each being deflected at a unique angle relative to an axis of a fuel injection valve, an aspect ratio of the orifice formed with a full shear surface being 1.5 or more, and having a protruding spherical portion disposed on a downstream side of the orifice will be described with reference to FIGS. 4 and 5.

Figure 4:
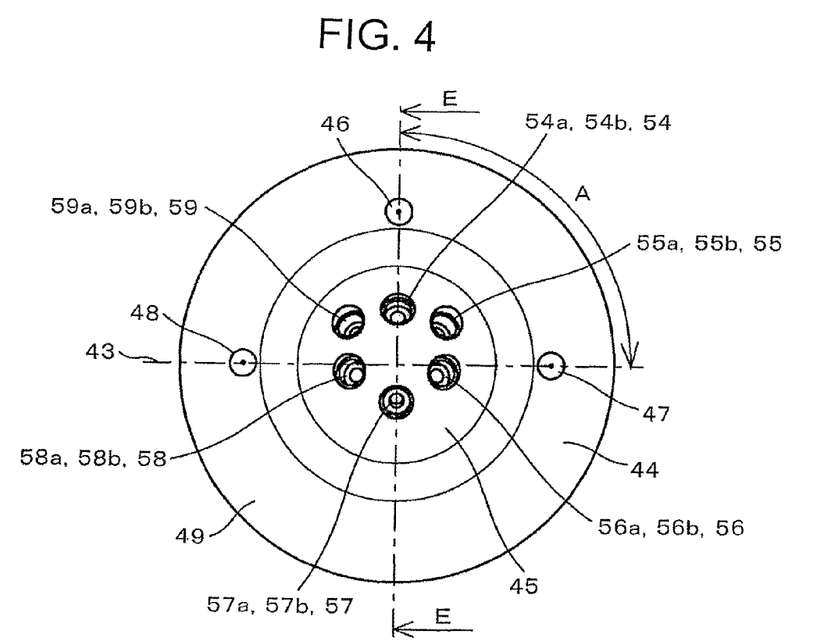
FIG. 4 is a plan view showing an orifice plate.

FIG. 4 is a plan view showing the orifice plate. FIG. 5 is a cross-sectional view taken along line E-E of FIG. 4.

An orifice plate 44 includes a spherical surface 45 in which three steps of holes (deburring holes 54a to 59a, counterbored holes 54b to 59b, orifices 54 to 59) are formed at six places to deflect at different angles relative to an axis 53 of the fuel injection valve. A flat surface portion 49 includes positioning holes 46 to 48, each being a conical bottomed hole, disposed at three places. At this time, the positioning holes 47, 48 are disposed at opposing positions 180 degrees apart from each other, equidistantly from a center of the orifice plate 44. The positioning hole 46 is disposed substantially in the middle between the two. This forms a rotating direction reference axis 43 that connects between centers of the positioning holes 47, 48.

The orifices 54 to 59, which are formed to deflect at different angles relative to the axis 53 of the fuel injection valve, cannot be used as positioning reference for the rotating direction during assembly into a fuel injection valve main body. The assembly into the fuel injection valve main body is therefore accomplished with reference to the rotating direction reference axis 43. By so doing, high accuracy can be achieved in a spray position and variations in the spray position can be inhibited. Additionally, each of the positioning holes 46 to 48 is formed into a conical bottomed hole, which enhances visibility when the holes are viewed from directly above. This makes for easy image processing during positioning of the rotating direction, thus improving assembly accuracy.

A calculation method for hole coordinate values of X, Y, Z, A, and B will be described below. As examples, calculation of coordinate values of the flattened bottom hole 54a, the counterbored hole 54b, and the orifice 54 will be described.

In the horizontal press 1, assume that a position at which the axis Z and the axis A are parallel to each other is an initial position (the condition of FIG. 1). With the B-axis at the initial position, let a position at which the axis A is centered with respect to the punches 17 to 22 be an X-coordinate or Y-coordinate origin of each punch and let a position at which an end surface of the cutting edge portion of each of the punches 17 to 22 is aligned with a center 45a of the spherical surface portion 45 be a Z-coordinate origin of each punch. The distance between the center 45a of the spherical surface portion 45 and a bottom surface of each of the flattened bottom hole 54a and the counterbored hole 54b is the Z-coordinate of each hole. In addition, the Z-coordinate value of the orifice 54 is that at which the hole is penetrated during formation of a seat portion 44a. At this time, the orifice 54 has a bottom surface inside the recessed portion 12b.

A projection angle of the rotating direction reference axis 43 and an axis of the orifice 54 projected onto the flat surface portion 49 is an angle A. In a cross section that passes through the axis of the orifice 54 and that is perpendicular to the flat surface portion 49, a projection angle of the axis 53 of the fuel injection valve and the axis of the orifice 54 projected onto the perpendicular cross section is an angle B. When the A-axis and the B-axis are rotated through the angles A and B from the initial condition with the orifice plate 44 held in the horizontal press 1, the axis of the orifice 54 becomes parallel with the axis Z. Movements of the axis of the orifice 54 and the axis of the orifice processing punch 22 from the origins as the axes are centered in this condition are X- and Y-coordinates.

When the coordinate values of X, Y, A, and B calculated as described above are inputted, the hole axis and the punch axis coincide with each other and the axis is in parallel with the Z-axis. Inputting the coordinate value of Z in this condition allows a predetermined hole depth to be processed.

Figure 5:
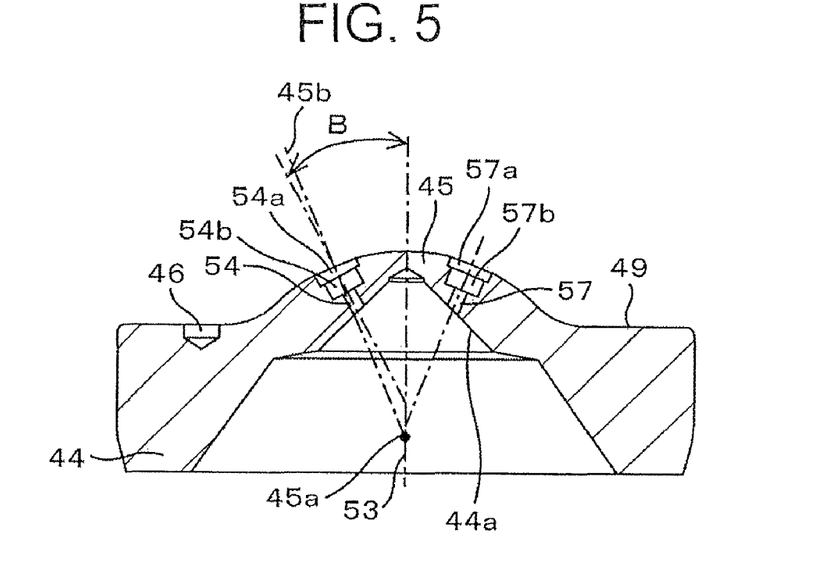
FIG. 5 is a cross-sectional view taken along line E-E of FIG. 4.
Figure 6:
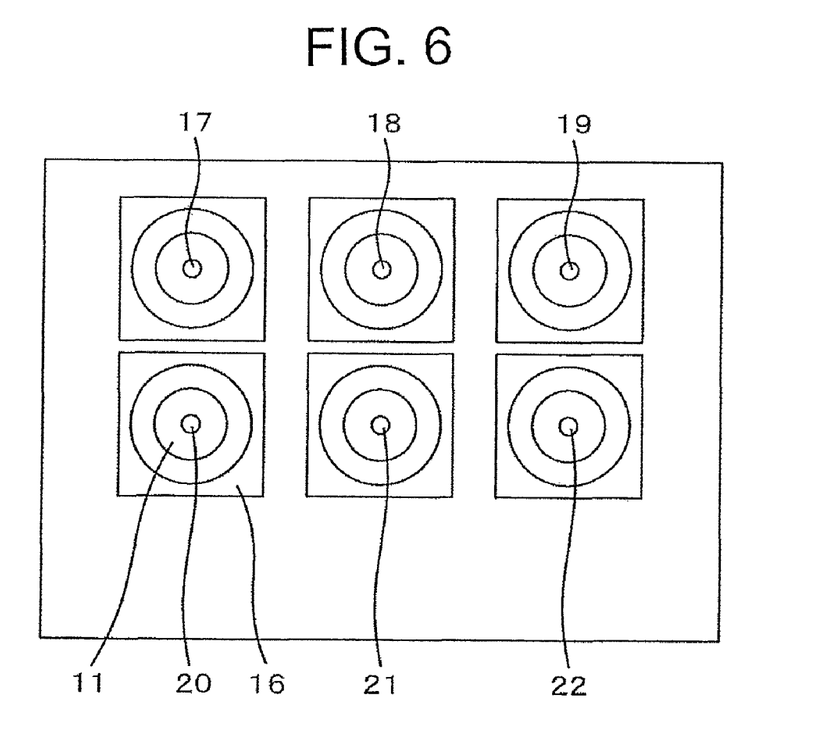
FIG. 6 is an illustration showing layout of punches (as viewed on arrow D of FIG. 1).
Figure 7:
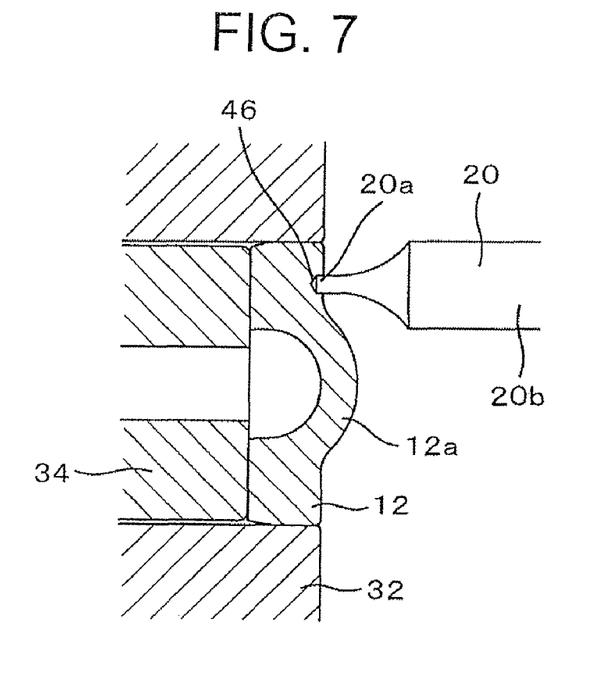
FIG. 7 is an enlarged view showing a processing portion of a positioning hole 46.
Figure 8:
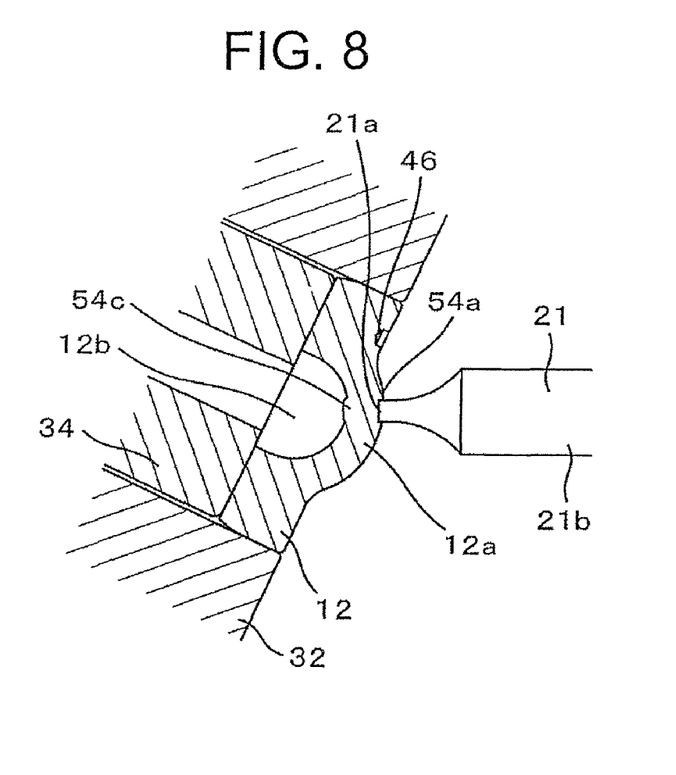
FIG. 8 is an enlarged view showing a processing portion of a flattened bottom hole 54*a*.
Figure 9:
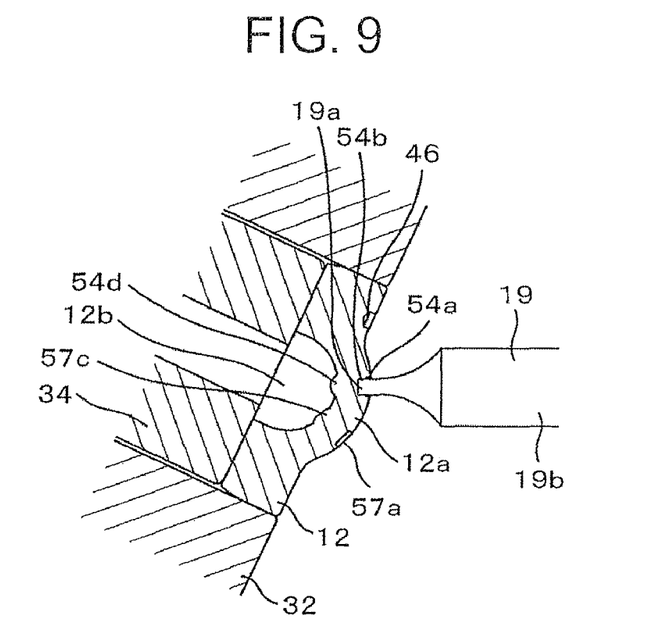
FIG. 9 is an enlarged view showing a processing portion of a counterbored hole 54*b*.
Figure 10:
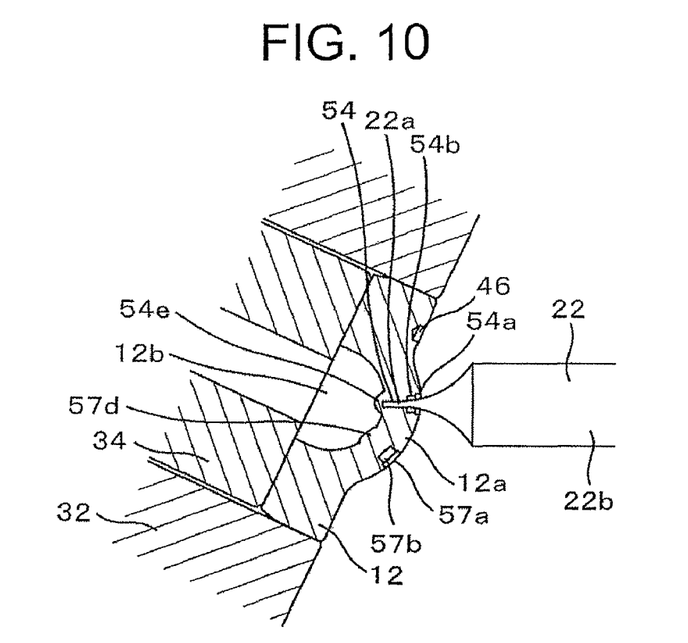
FIG. 10 is an enlarged view showing a processing portion of an orifice 54.

A processing method will be described below with reference to FIGS. 6 to 11, when the present invention is applied to processing of a shouldered hole in a cylindrical orifice plate having a plurality of orifices, each being deflected at a unique angle relative to an axis of a fuel injection valve, an aspect ratio of the orifice formed with a full shear surface being 1.5 or more, and having a protruding spherical portion disposed on a downstream side of the orifice as shown in FIGS. 4 and 5. FIG. 6 is an illustration showing layout of punches (as viewed on arrow D of FIG. 1). FIG. 7 is an enlarged view showing a processing portion of the positioning hole 46. FIG. 8 is an enlarged view showing a processing portion of the flattened bottom hole 54a. FIG. 9 is an enlarged view showing a processing portion of the counterbored hole 54b. FIG. 10 is an enlarged view showing a processing portion of the orifice 54.

Three different types of punches, each having a unique diameter, are required for processing the three steps of holes (the flattened bottom holes 54a to 59a, the counterbored holes 54b to 59b, and the orifices 54 to 59). One type of punch is required for processing the conical bottomed holes (the positioning holes 46 to 48). Accordingly, the positioning hole processing punch 20 for processing the positioning holes 46 to 48, the flattened bottom hole processing punch 21 for processing the deburring holes 54a to 59a, the counterbored hole processing punch 19 for processing the counterbored holes 54b to 59b, and the orifice processing punch 22 for processing the orifices 54 to 59 are disposed as shown in FIG. 6. The flattened bottom hole processing punch 21, the counterbored hole processing punch 19, and the orifice processing punch 22 are of a shouldered cylindrical shape having the same dimension for the shank portions 19b to 22b and different dimensions for the cutting edges 19a to 22a. The cutting edges 19a to 22a have greater diameter dimensions in the order of the flattened bottom hole processing punch 21, the counterbored processing punch 19, and the orifice punch 22.

The positioning hole processing punch 20 has a shank portion 20b with the same dimension as the other punch shank portions 19b to 22b, but differs from other punches in that a cutter portion 20a is conical.

Inputted in advance to the control unit 36 are, for example, the coordinate values of X, Y, Z, A, and B of each of the positioning holes 46 to 48, the deburring holes 54a to 59a, the counterbored holes 54b to 59b, and the orifices 54 to 59, a specific punch used for each hole, punch operating sequence, the pressure/removal speed of the punches 19 to 22, a bottom dead center stop time, and operation timing of the actuator a 29 and the actuator b 30.

Processes for processing the shouldered hole will be described in detail below. The control unit 36 uses an NC program to control the following operations.

Processing of the positioning holes 46 to 48 will first be described with reference to FIGS. 1 and 7. After the work 12 is inserted in the chuck 32 by a loader or manually, the actuator a 29 applies a thrust force in the axis A-direction, so that a clamping force in a diametric direction is transmitted via the sleeve 33 to the chuck 32, thus causing the chuck 32 to hold the work 12 in position. The cutting edge portion 20a of the positioning hole processing punch 20 and an axial center of the positioning hole 46 are thereafter aligned with each other by rapid traverse through an operation of the X-direction actuator 7 and the Y-direction actuator 9. At this time, the A-axis and the B-axis remain in the initial positions (the axis Z and the axis A are parallel to each other). Through an operation of the Z-direction actuator 4 thereafter, the cutting edge portion 20a of the positioning hole processing punch 20 is fed upwardly of the positioning hole 46 by rapid traverse. The positioning hole processing punch 20 is thereafter fed at a predetermined speed to apply pressure until a leading end of the cutting edge portion 20a of the positioning hole processing punch 20 reaches a Z-coordinate value corresponding to the bottom surface of the positioning hole 46, and is held stationary at a bottom dead center for a predetermined period of time. The positioning hole processing punch 20 is thereafter fed upwardly of the positioning hole 46 at a predetermined speed in the axis Z-direction, and is thereby removed. Any traveling speed of the positioning hole processing punch 20 can be set. The speed on the removal side may be made faster than the speed on the pressure side for enhanced production efficiency. Note that the speed on the pressure side is determined in consideration of a life of the positioning hole processing punch 20 (an excessively increased speed results in a reduced life). At this time, setting any desired time for the bottom dead center stop time of the positioning hole processing punch 20 helps inhibit springback of a material, achieving high accuracy in hole depth.

The positioning holes 47, 48 are processed sequentially in the same manner. The positioning holes 46 to 48 of a blind hole can thus be formed to offer good surface roughness in a full shear surface.

Processing of the deburring holes 54a to 59a will be described below with reference to FIG. 8. After the positioning hole 48 has been processed and the positioning hole processing punch 20 removed upwardly of the positioning hole 48, processing by the flattened bottom hole processing punch 21 will be continued with the work 12 left clamped. The A-axis and the B-axis are rotated by the operation of the A-axis actuator 28 and the B-axis actuator 24, so that the hole 54a is in parallel with the Z-axis. A cutting edge portion 21a of the flattened bottom hole processing punch 21 and an axial center of the flattened bottom hole 54a are aligned with each other by rapid traverse through the operation of the X-direction actuator 7 and the Y-direction actuator 9. The flattened bottom hole processing punch 21 is thereafter fed at a predetermined speed to apply pressure until a leading end of the cutting edge portion 21a of the flattened bottom hole processing punch 21 reaches a Z-coordinate value corresponding to the bottom surface of the flattened bottom hole 54a, and is held stationary at a bottom dead center for a predetermined period of time. At this time, part of the material pushed by the cutting edge portion 21a forms a swelled portion 54c on the side of the recessed portion 12b. The flattened bottom hole processing punch 21 is thereafter fed upwardly of the flattened bottom hole 54a at a predetermined speed in the axis Z-direction, and is thereby removed. Any traveling speed of the flattened bottom hole processing punch 21 can be set. The speed on the removal side may be made faster than the speed on the pressure side for enhanced production efficiency. Note that the speed on the pressure side is determined in consideration of a life of the flattened bottom hole processing punch 21 (an excessively increased speed results in a reduced life). At this time, setting any desired time for the bottom dead center stop time of the flattened bottom hole processing punch 21 helps inhibit springback of the material, achieving high accuracy in hole depth.

The deburring holes 55a, 56a, 57a, 58a, and 59a are processed sequentially in the same manner. The deburring holes 54a to 59a of a blind hole can thus be formed to offer good surface roughness in a full shear surface. In addition, swelled portions 54c to 59c are formed on the recessed portion 12b side.

Processing of the counterbored holes 54b to 59b will be described below with reference to FIG. 9. After the deburring hole 59a has been processed and the flattened bottom hole processing punch 21 removed upwardly of the deburring hole 59a, processing by the counterbored hole processing punch 19 will be continued with the work 12 left clamped. The A-axis and the B-axis are rotated by the operation of the A-axis actuator 28 and the B-axis actuator 24, so that the counterbored hole 54b is in parallel with the axis Z. A cutting edge portion 19a of the counterbored hole processing punch 19 and an axial center of the counterbored hole 54b are aligned with each other by rapid traverse through the operation of the X-direction actuator 7 and the Y-direction actuator 9. The counterbored hole processing punch 19 is thereafter fed at a predetermined speed to apply pressure until a leading end of the cutting edge portion 19a of the counterbored hole processing punch 19 reaches a Z-coordinate value corresponding to the bottom surface of the counterbored hole 54b, and is held stationary at a bottom dead center for a predetermined period of time. At this time, part of the material pushed by the cutting edge portion 19a forms a swelled portion 54d on the side of the recessed portion 12b. The counterbored hole processing punch 19 is thereafter fed upwardly of the counterbored hole 54b at a predetermined speed, and is thereby removed. Any traveling speed of the counterbored hole processing punch 19 can be set. The speed on the removal side may be made faster than the speed on the pressure side for enhanced production efficiency. Note that the speed on the pressure side is determined in consideration of a life of the counterbored hole processing punch 19 (an excessively increased speed results in a reduced life). At this time, setting any desired time for the bottom dead center stop time of the counterbored hole processing punch 19 helps inhibit springback of the material, achieving high accuracy in hole depth.

The counterbored holes 55b, 56b, 57b, 58b, and 59b are processed sequentially in the same manner. The counterbored holes 54b to 59b of a blind hole can thus be formed to offer good surface roughness in a full shear surface. In addition, swelled portions 54d to 59d are formed on the recessed portion 12b side.

Processing of the orifices 54 to 59 will be described below with reference to FIG. 10. After the counterbored hole 59b has been processed and the counterbored hole processing punch 19 removed upwardly of the counterbored hole 59b, processing by the orifice processing punch 22 will be continued with the work 12 left clamped. The A-axis and the B-axis are rotated by the operation of the A-axis actuator 28 and the B-axis actuator 24, so that the orifice 54 is in parallel with the axis Z. A cutting edge portion 22a of the orifice processing punch 22 and an axial center of the orifice 54 are aligned with each other by rapid traverse through the operation of the X-direction actuator 7 and the Y-direction actuator 9. The orifice processing punch 22 is thereafter fed at a predetermined speed to apply pressure until a leading end of the cutting edge portion 22a of the orifice processing punch 22 reaches a Z-coordinate value corresponding to the bottom surface of the orifice 54 (inside the recessed portion 12b), and is held stationary at a bottom dead center for a predetermined period of time. At this time, part of the material pushed by the cutting edge portion 22a forms a swelled portion 54e on the side of the recessed portion 12b. The orifice processing punch 22 is thereafter fed upwardly of the orifice 54 at a predetermined speed and is thereby removed. Any traveling speed of the orifice processing punch 22 can be set. The speed on the removal side may be made faster than the speed on the pressure side for enhanced production efficiency. Note that the speed on the pressure side is determined in consideration of a life of the orifice processing punch 22 (an excessively increased speed results in a reduced life). At this time, setting any desired time for the bottom dead center stop time of the orifice processing punch 22 helps inhibit springback of the material, achieving high accuracy in hole depth.

The orifices 55, 56, 57, 58, and 59 are processed in the same manner. The orifices 54 to 59 of a blind hole can thus be formed to offer good surface roughness in a full shear surface. In addition, swelled portions 54e to 59e are formed on the recessed portion 12b side.

Forming the swelled portions 54d to 59d during counterboring helps minimize a tensile force of the material by the punch cutting edge portion even if the orifice processing punch is fed deep into the inside of the recessed portion 12b. This prevents fracture from developing and allows the orifices 54 to 59 to be formed in a full shear surface, so that variations in spray can be inhibited.

The following effects can be achieved through the foregoing processing.

(1) The three steps of holes (the deburring holes 54a to 59a, the counterbored holes 54b to 59b, and the orifices 54 to 59) can be processed to achieve good coaxiality using a press, which offers improved surface roughness as compared with those in which orifices are processed through, for example, electrical discharge machining or cutting. This helps reduce the amount of combustion residue such as, for example, carbon produced through combustion of fuel during direction injection deposited on the three steps of holes (the deburring holes 54a to 59a, the counterbored holes 54b to 59b, and the orifices 54 to 59), thus achieving spray atomization and improved shape and positional accuracy.

(2) The work 12 in a clamped position can be processed, so that the processing can be performed, while achieving accuracy in positions of the positioning holes 46 to 48 and the orifices 54 to 59 relative to a work outside diameter and in coaxiality of the three steps of holes (the deburring holes 54a to 59a, the counterbored holes 54b to 59b, and the orifices 54 to 59). There is no need of positioning through image processing. Further, processing is performed continuously using punches disposed in a comb shape. This eliminates the need for tool change, thus significantly reducing a processing cycle time, so that an orifice plate with only small variations in spray position can be processed at low cost and with high productivity, while keeping low an equipment investment cost.

(3) The spherical surface portion includes the flat surface portion (counterbored hole bottom surface) that is at right angles with the axis of the orifice and the orifice is pressed at right angles with the flat surface portion. No bending force is therefore applied to the punch and thus the tool is not likely to break. Even a martensite-based stainless steel having a carbon content of 0.25% or more (for example, SUS420J2) can be processed easily to produce a straight deep hole with an aspect ratio of 1.5 or more a full shear surface. Spray performance of the injector can therefore be improved.

Additionally, an outlet of the counterbored hole and an outlet of the orifice are a plane orthogonal to the axis of the orifice. This makes uniform injection timing of a fluid throughout the entire periphery, so that a penetration length can be made uniform even with an orifice that deflects relative to the axis of the injection valve, thus improving spray homogeneity.

(4) Even if the orifices 54 to 59 are formed to deflect at different angles relative to the axis 53 of the fuel injection valve, the A-axis and the B-axis are operated to orient the orifices 54 to 59 in parallel with the axis Z before starting processing. This requires that the orifice processing punch 22 follow a processing path of only a straight-ahead motion in the Z-direction as effected by the operation of the Z-direction actuator 4. As a result, no bending load is applied to the orifice processing punch 22. As compared with a processing method that involves skew feed by cooperatively activating the X- and Y-direction actuators, the life of the orifice processing punch 22 can be improved and production efficiency can be enhanced.

(5) An arrangement is made such that the pressure from the punches 19 to 22 to the work 12 is received by a gripping force of the chuck 32 and the ejector pin 34. The work 12 does not therefore move in the axis A-direction during pressurizing, thus allowing an orifice length to be formed highly accurately and the penetration length to be stabilized.

Figure 11:
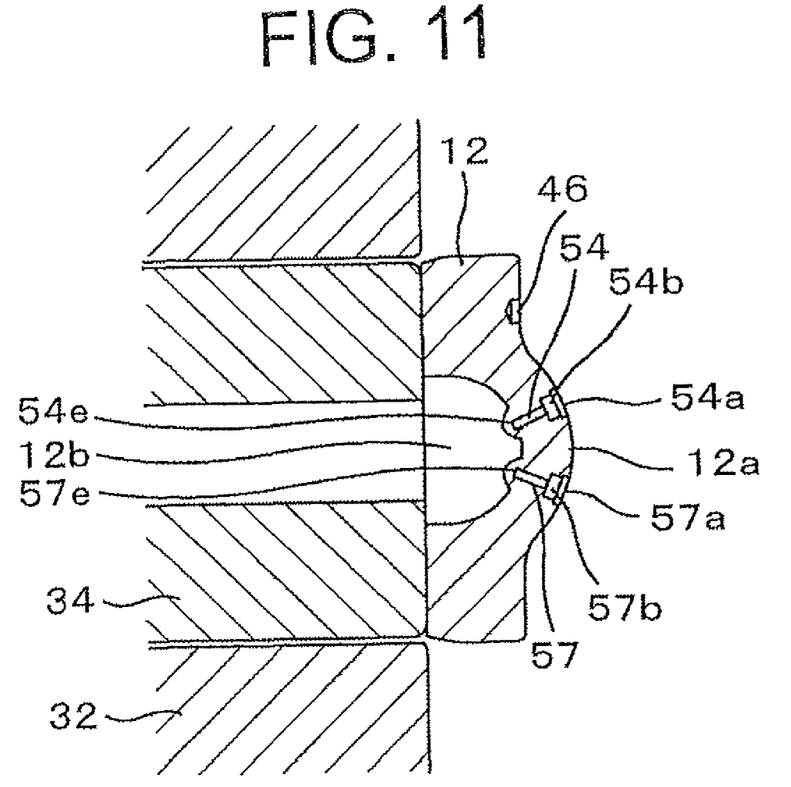
FIG. 11 is an enlarged view showing a processing portion after a work is unloaded.

Finally, ejection of the work 12 will be described with reference to FIG. 11. The orifice 59 has been processed and the orifice processing punch 22 removed upwardly of the orifice 59. Then, the A-axis and the B-axis are returned to the initial positions (where the axis Z is in parallel with the axis A). The actuator a 29 is then operated to open the chuck 32. The actuator b 30 is thereafter operated to apply a thrust force to the ejector pin 34, thereby moving the ejector pin 34 in the axis A-direction. The work 12 is thereby ejected out of the chuck 32. The work 12 is then unloaded out of the horizontal press 1 by a loader or manually.

Finally, the seat portion 44a of the work 12 is formed by cutting or electrical discharge machining to let the orifices 54 to 59 penetrate, thus making orifices in a full shear surface. This minimizes variations in the spray position and penetration length.

The orifices 54 to 59 of the orifice plate 44 are formed to have an aspect ratio of 1.5 or more. As compared with processing of orifices having an aspect ratio of about 1, a greater processing load is involved and therefore a removal load (about 20 to 40% of the processing load) is large when the punch is removed after the processing. To ensure high dimensional accuracy of the hole bottom surface, therefore, the gripping force of the chuck 32 relative to the work 12 needs to be set so that the work 12 is not deviated in the axis A-direction even with this removal force applied thereto.

In addition, the deburring holes 54a to 59a are formed to deflect at different angles relative to the axis 53 of the fuel injection valve and angled relative to a normal line 45b of the spherical surface 45. A rotational moment about the A-axis is therefore applied to the work 12 during deburring. The flattened bottom hole processing punch 21 has the largest punch diameter of the four different types of punches, offering a large processing force. Accordingly, to ensure processing of holes to high positional accuracy, it is necessary to set the gripping force of the chuck 32 relative to the work 12 to ensure that the work 12 does not rotate about the A-axis even with the rotational moment applied thereto.

Consequently, a large thrust force is required for the chuck 32 and the actuator a 29 becomes massive for processing a shouldered hole in a cylindrical orifice plate having a plurality of orifices, each being deflected at a unique angle relative to an axis of a fuel injection valve, an aspect ratio of the orifice formed with a full shear surface being 1.5 or more, and having a protruding spherical portion disposed on a downstream side of the orifice.

In addition, it is essential to install a loader for implementing a system of automatically supplying and unloading works 12 for the improved productivity and an ejection mechanism that ejects the works 12 outside the chuck 32 is needed to unload the works 12 onto the loader. To that end, the actuator b 30 is necessary that actuates the ejector pin 34 as in the present invention. The horizontal press 1 used in the present invention is arranged to include no structural bodies at portions at which the actuator a 29 and the actuator b 30 are installed, so that an installation site and size of the actuator a 29 and the actuator b 30 can be freely selected. Accordingly, the actuator a 29 may be built largely to offer a larger gripping force for the chuck 32 and, moreover, the actuator b 30 can be mounted on an end surface of the actuator a 29.

In the foregoing embodiment, six punches are set. Nonetheless, the number of punches set may be increased depending on specifications of a product.

Examples of the present invention applied to orifice processing will be given below.

(1) If the deflection angle of the orifice is to be changed, a program with the coordinate values changed is prepared in advance. This allows the deflection angle to be changed by simply selecting the program without having to change parts, thus implementing changes in specifications at low cost and within a short delivery time.

(2) If, for example, six holes are processed with a single punch, a processing error of the punch is multiplied by six, which makes it difficult to adjust a flow rate. If two punches having diameters deviated the same amount in the positive or negative direction from a target punch diameter are used to process three holes each, then the processing error is offset, facilitating flow rate adjustment. Accordingly, if, for example, an orifice punch having a diameter larger by 0.001 mm than the target punch diameter, which would result in a flow rate fault if used individually, is mounted as the punch 17 and an orifice punch having a diameter smaller by 0.001 mm than the target punch diameter, which would result in a flow rate fault if used individually, is mounted as the punch 18 and the punches are used to process three holes each, the flow rate of the entire six holes becomes normal. Use of the punches in combination is therefore permitted even involving a punch processing error, which enables flow rate adjustment at low cost.

(3) If the position, angle, depth, and diameter of the orifices 54 to 59 are to be changed, advance preparation of programs and input of the programs in the control unit 36 will significantly improve productivity. Specifically, in FIG. 6 showing the layout of the punches, orifice punches with different diameters are previously mounted as punches 17, 18 and a program 2 or a program 3 stored in the control unit 36 containing different punches to be used for different holes having different positions, angles, and depths from each other is selected appropriately to respond to the change in models. The simple change of the programs without involving changes of parts saves setup time.

(4) Referring to FIG. 6 showing the layout of the punches, if orifice punches having different diameters from each other are previously mounted as the punches 17, 18, 22, an orifice plate having three different orifice diameters can be manufactured. At this time, the processing can be performed with the work left clamped in the chuck, so that the three different types of orifices can be processed to achieve high positioning accuracy with reference to the outside diameter of the work 12. An orifice plate having small variations in the spray position can thus be processed at low cost and with high productivity.

It should be understood that the present invention is not limited to the disclosed embodiment and various modifications and alterations that do not depart from the scope and spirit of the present invention are possible. For example, processing is possible that makes planes at a plurality of places on the spherical surface, each plane having a unique angle relative to the axis (changing the spherical surface into a polyhedron). The A-axis and the B-axis are operated to tilt the work such that the flat surface portion is at right angles with the Z-axis. Press the work by feeding the punch in the Z-direction until the punch cutting edge reaches the flat surface portion. After the punch is stopped at the bottom dead center, the punch is removed. Thereafter, feed the punch in the X- and Y-direction at a feed pitch of half or less of the punch diameter and then repeat operating the punch in the Z-direction in the same manner. This produces a flat surface portion larger than the punch diameter.

At this time, a high upsetting accuracy can be achieved with springback of the material minimized by setting the punch pressure speed and bottom dead center stop time to any desired values.

What is claimed is:

1. A method for processing an orifice, comprising:
a first step of selecting any one of a plurality of punches which is disposed so as to have an axis in a horizontal direction;
a second step of, following the first step, positioning the punch in a first axis direction that is perpendicular to a vertical direction and a punch axis direction, and positioning the punch in the vertical direction;
a third step of positioning a work held in a chuck by oscillating and rotating the work about a second axis in the vertical direction and a third axis in the horizontal direction oscillatable about the second axis;
a fourth step of, following the second and third steps, pressing to process the work by moving the punch straightforwardly in the punch axis direction to form an orifice in the work;
a fifth step of, following the fourth step, removing the punch from the work by moving the punch straightforwardly in a direction opposite the straightforward direction in the fourth step; and
returning to the first step with the work held in the chuck after performance of steps of from the first through fifth steps, selecting a punch that is different from the punch selected in the first step, and performing the second through fifth steps to thereby process holes including the orifice and a recessed portion disposed at an outlet opening portion of the orifice.

2. The method for processing the orifice according to claim 1,
wherein a recessed portion having an axis inclined relative to a central axis of the work is formed on a surface of the work by performing steps of from the first through fifth steps;
after the recessed portion has been formed, another recessed portion is formed at a position different from the recessed portion using the punch used for pressing to process the recessed portion by performing steps of from the second through fifth steps, to thereby form a plurality of recessed portions;
after the plurality of recessed portions have been formed, another punch that is different from that used for pressing to process the plurality of recessed portions is selected by performing the first step and an orifice is formed in any one of the plurality of recessed portions by performing steps of from the second through fifth steps; and after the orifice has been formed, another orifice is formed using the punch used for pressing to process the orifice in another recessed portion of the plurality of recessed portions by performing steps of from the second through fifth steps.

3. The method for processing the orifice according to claim 1,
wherein the work has a cylindrical shape including a protruding spherical portion disposed on an end surface on one side in the central axis direction and a bowl-shaped recessed portion formed on an end surface thereof opposite the spherical portion; and
the work is held such that the spherical portion has a center in contact with the second axis.

4. The method for processing the orifice according to claim 3,
wherein a plurality of holes are blanked from a side of the spherical portion of the work.

5. The method for processing the orifice according to claim 3,
wherein a hole is pressed from the side of the spherical portion of the work in steps to form a blind hole substantially coaxially, thereby forming a swelled portion on an inside of the bowl-shaped recessed portion.

6. The method for processing the orifice according to claim 5,
wherein the hole processed to form steps therein to form a shouldered hole is formed in a direction angled relative to the central axis of the work; and
the steps are formed to have smaller diameters toward a side of the bowl-shaped recessed portion relative to a side of a sphere of the spherical portion.

7. The method for processing the orifice according to claim 6,
wherein the hole processed to form steps therein to form the shouldered hole is formed in a plurality of sets; and
the hole is angled relative to the central axis of the work differently at least between two sets.

8. The method for processing the orifice according to claim 7,
wherein the shouldered hole is formed in three steps including the orifice.

9. The method for processing the orifice according to claim 5, further comprising:
after the step of processing the orifice, processing a valve seat by cutting the side of the bowl-shaped recessed portion of the work or subjecting the same to electrical discharge machining, and by penetrating the orifice hole.

10. The method for processing the orifice according to claim 1,
wherein speed of punch processing is faster on a removal side than on a pressure side.

* * * * *